United States Patent
Matsumura

(10) Patent No.: US 11,062,264 B2
(45) Date of Patent: *Jul. 13, 2021

(54) WORK SUPPORT SYSTEM, WORK SUPPORT SERVER, WORK SITUATION DETERMINATION APPARATUS, DEVICE FOR WORKER, AND WORK OBJECT EQUIPMENT

(71) Applicant: GRACE TECHNOLOGY, INC., Tokyo (JP)

(72) Inventor: Yukiharu Matsumura, Tokyo (JP)

(73) Assignee: GRACE TECHNOLOGY, INC., Tokyo (JP)

( * ) Notice: Subject to any disclaimer, the term of this patent is extended or adjusted under 35 U.S.C. 154(b) by 274 days.

This patent is subject to a terminal disclaimer.

(21) Appl. No.: 16/349,844

(22) PCT Filed: Mar. 8, 2019

(86) PCT No.: PCT/JP2019/009465
§ 371 (c)(1),
(2) Date: May 14, 2019

(87) PCT Pub. No.: WO2020/183543
PCT Pub. Date: Sep. 17, 2020

(65) Prior Publication Data
US 2021/0004764 A1 Jan. 7, 2021

(51) Int. Cl.
*G06Q 10/10* (2012.01)
*G06Q 10/06* (2012.01)
(Continued)

(52) U.S. Cl.
CPC .......... *G06Q 10/10* (2013.01); *G05B 19/406* (2013.01); *G06N 5/025* (2013.01); *G06N 20/00* (2019.01);
(Continued)

(58) Field of Classification Search
None
See application file for complete search history.

(56) References Cited

U.S. PATENT DOCUMENTS 10,769,536 B2 * 9/2020 Matsumura ............. G06F 1/163
2003/0142097 A1 * 7/2003 Sakagami ............ G06F 3/0481
345/473

(Continued)

FOREIGN PATENT DOCUMENTS

| JP | 2004310311 A | 11/2004 |
| JP | 2011248860 A | 12/2011 |
| JP | 6321879 B1 | 5/2018 |

OTHER PUBLICATIONS

El-Diraby, et al., A Semantic Framework to Support Corporate Memory Management in Building Construction, Automation in Construction 15, 2006, pp. 504-521, 2006 https://www.sciencedirect.com/science/article/pii/S0926580505000944 (Year: 2006).*

(Continued)

*Primary Examiner* — Octavian Rotaru
(74) *Attorney, Agent, or Firm* — Rankin, Hill & Clark LLP

(57) ABSTRACT

A work support system that is suitable for reducing communication loads and processing loads, and improving certainty and versatility, is provided.

An AI manual server 100 generates a rule describing a determination condition of a work situation based on a manual, and transmits the rule to a smart device 300. A work situation determination apparatus 220 comprises a storage section that stores work situation information indicating a work situation in association with equipment signal information. The work situation determination apparatus 220 inputs an equipment signal from a PLC of object equipment 210, reads out the work situation information corresponding to the input equipment signal from the storage section, and (Continued)

transmits the readout work situation information to the smart device 300. The smart device 300 receives the rule, and stores this in the storage section 58. The smart device 300 receives the work situation information from the work situation determination apparatus 220, and displays the work support information on a notification section 52 based on the rule of the storage section 58 and the received work situation information.

13 Claims, 10 Drawing Sheets

(51) Int. Cl.
*G06N 20/00* (2019.01)
*G05B 19/406* (2006.01)
*G06N 5/02* (2006.01)
*G06F 40/47* (2020.01)

(52) U.S. Cl.
CPC ..... *G06Q 10/067* (2013.01); *G06Q 10/06398* (2013.01); *G05B 2219/50185* (2013.01); *G06F 40/47* (2020.01)

(56) References Cited

U.S. PATENT DOCUMENTS

| | | | |
|---|---|---|---|
| 2009/0037801 A1* | 2/2009 | Ye | G06F 16/93 715/202 |
| 2011/0047468 A1* | 2/2011 | Ishizaka | G06F 9/54 715/735 |
| 2013/0120449 A1 | 5/2013 | Ihara | |
| 2016/0171774 A1* | 6/2016 | Aonuma | G11B 27/031 345/633 |
| 2016/0209916 A1* | 7/2016 | Sendai | G02B 27/017 |
| 2019/0362556 A1* | 11/2019 | Ben-Dor | G06K 7/10396 |
| 2019/0392644 A1* | 12/2019 | Keselman | G07C 3/005 |
| 2020/0057973 A1* | 2/2020 | Suzuki | G06N 5/025 |

OTHER PUBLICATIONS

International Search Report dated May 7, 2019 filed in PCT/JP2019/009465.

\* cited by examiner

FIG. 7

■RULE SET—EXAMPLE 1: HEADING 1 (WORKER HIMSELF/HERSELF)

RULE EXAMPLE 1-1 (EXPANSION OF EXPLANATORY TEXT)
if [BODY TEMPERATURE] IS [ABNORMAL] then [NOTIFY] [MANAGER] OF [ABNORMALITY] OF "WORKER' BODY"

RULE EXAMPLE 1-2 (EXPANSION OF EXPLANATORY TEXT)
if [POSITION] IS [IN THE SURROUNDING] OF [OBJECT EQUIPMENT] then RULE SET—EXAMPLE 2: WORK PREPARATION
.
.

■RULE SET—EXAMPLE 2: HEADING 2 (WORK PREPARATION)

RULE EXAMPLE 2-1
if not [WORKER] [WEAR] [GLOVES] then [INSTRUCT] [WORKER] TO [WEAR] [GLOVES]
.
.

■RULE SET—EXAMPLE N: HEADING N (EXCHANGE WORK—AFTER REMOVING OLD COMPONENT, INSTALL NEW COMPONENT)

RULE EXAMPLE N-1
if [DESIGNATED POSITION] OF [OBJECT EQUIPMENT] IS [VACANT]
  then CONTINUE WORK
else [ISSUE] [WARNING-1] TO [WORKER]

RULE EXAMPLE N-2
if [WORKER] [HOLDS] [COMPONENT A] IN [HIS/HER HAND] and [COMPONENT A] MATCHES [IMAGE-1]
  then CONFIRM [ORIENTATION OF COMPONENT A].
.
.

■RULE SET—EXAMPLE M: HEADING N (ORIENTATION OF COMPONENT A)
RULE EXAMPLE M-1
if [COMPONENT A] IS [IN THE DESIGNATED ORIENTATION] then ADVANCE TO [INSERTION WORK] OF [COMPONENT A]
.
.

■DECISION TABLE (PROCESS ORDER AND WORK EVALUATION)
(OMIT)
■STATE TABLE (STATE TRANSITION OF SITUATION OR OBJECT)
(OMIT)

FIG. 10

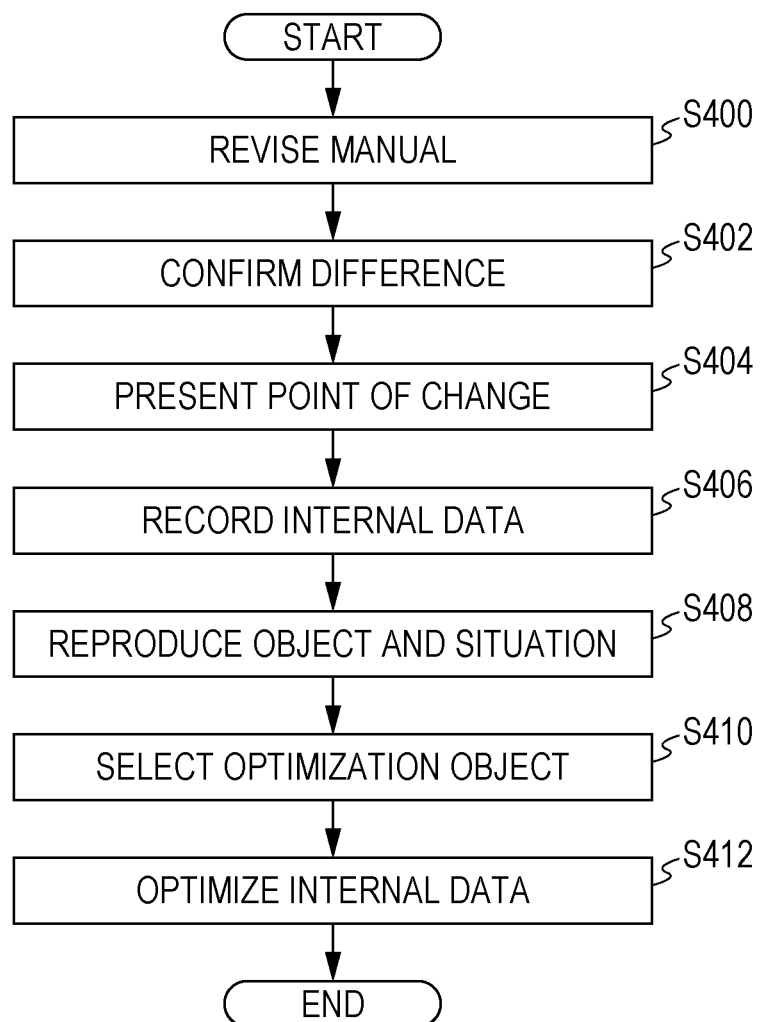

WORK SUPPORT SYSTEM, WORK SUPPORT SERVER, WORK SITUATION DETERMINATION APPARATUS, DEVICE FOR WORKER, AND WORK OBJECT EQUIPMENT

TECHNICAL FIELD

The present invention relates to a system, a server, an apparatus, a device, and equipment for supporting work of a worker, and particularly relates to a work support system, a work support server, a work situation determination apparatus, a device for worker, and work object equipment that are suitable for reducing communication loads and processing loads, and improving certainty and versatility.

BACKGROUND ART

Conventionally, for example, a work support system described in Patent Literature 1 has been known as a technique for supporting work.

The work support system described in Patent Literature 1 extracts terms from a manual describing procedures, contents, points of attention, or other matters of work based on a term table in which one or multiple terms are registered, and generates a rule describing a determination condition of a work object or work situation having the extracted terms as elements. Furthermore, the work support system acquires sensor information from a device, and recognizes the work object and the work situation associated with the terms to become the elements in the determination condition based on the acquired sensor information, so as to transmit work support information to the device based on the rule and a recognition result.

CITATION LIST

Patent Literature

PATENT LITERATURE 1: Japanese Patent No. 6321879

SUMMARY OF THE INVENTION

Technical Problem

However, the work support system described in Patent Literature 1 has the following problems: (1) communication loads are large due to generation of a large amount of sensor information; (2) since high-performance calculation capability is required for analysis of sensor information, a large-scale computer system will be required; (3) uncertainty cannot be eliminated even if processing is performed using new technology of image recognition, voice recognition, and the like; and (4) since advanced information processing is performed, a mechanism thereof will be dedicated to the work object equipment, and application and development to similar pieces of equipment are difficult.

Therefore, the present invention is made by focusing on such unsolved problems of the conventional technique, and an object thereof is to provide a work support system, a work support server, a work situation determination apparatus, a device for worker, and work object equipment that are suitable for reducing communication loads and processing loads, and improving certainty and versatility.

Solution to the Problem

[Invention 1] In order to achieve the above-described objective, a work support system of Invention 1 is a work support system that is communicably connected to a device having a notification means that is worn or carried by a worker, for supporting work of the above-described worker, comprising: a rule generation means that generates a rule describing a determination condition of a work situation based on a manual describing procedures, contents, points of attention, or other matters of work; a work situation determination means that determines the above-described work situation based on an equipment signal indicating a state or operation of work object equipment; and a work support information output means that outputs work support information to the above-described notification means based on the rule generated by the above-described rule generation means and a determination result of the above-described work situation determination means.

According to such a configuration, the rule generation means generates the rule based on the manual. In addition, the work situation determination means determines the work situation based on the equipment signal indicating the state or operation of the work object equipment. Furthermore, the work support information output means outputs the work support information to the notification means based on the rule and the determination result.

In this regard, the present system may be realized as a single apparatus, terminal or other equipment, or may be realized as a network system to which multiple apparatuses, terminals, or other pieces of equipment are communicably connected. In the case of the latter, respective constituent elements may belong to any of the multiple pieces of equipment and the like as long as they are communicably connected with one another. A configuration in which a device or other equipment comprises one or multiple means among the above-described respective means constituting the present system, is also included. Hereinafter, the same applies to work support systems of Invention 2 to Invention 4.

[Invention 2] Furthermore, the work support system of Invention 2 is a work support system that communicably connects a device that is worn or carried by a worker, a server, and a work situation determination apparatus, for supporting work of the above-described worker, wherein the above-described server comprises: a rule generation means that generates a rule describing a determination condition of a work situation based on a manual describing procedures, contents, points of attention, or other matters of the work; and a rule transmitting means that transmits the rule generated by the above-described rule generation means to the above-described device, the above-described work situation determination apparatus comprises: a signal input means that inputs, from work object equipment, an equipment signal indicating a state or operation of the work object equipment; a work situation determination means that determines the above-described work situation based on the equipment signal input by the above-described signal input means; and a work situation information transmitting means that transmits, to the above-described device, work situation information indicating a determination result of the above-described work situation determination means, and the above-described device comprises: a notification means; a rule receiving means that receives the above-described rule; a rule storage means that stores the rule received by the above-described rule receiving means; a work situation information receiving means that receives the above-described work situation information; and a work support information output means that outputs the work support information to the above-described notification means based on the rule of the above-described rule storage means and the work situation information received by the above-described work situation information receiving means.

According to such a configuration, in the server, the rule generation means generates the rule based on the manual, and the rule transmitting means transmits the generated rule to the device.

In the device, when the rule receiving means receives the rule, the received rule is stored in the rule storage means.

In addition, in the work situation determination apparatus, the signal input means inputs the equipment signal from the work object equipment, and the work situation determination means determines the work situation based on the input equipment signal. Furthermore, the work situation information transmitting means transmits the work situation information indicating the determination result of the work situation determination means to the device.

In the device, when the work situation information receiving means receives the work situation information, the work support information output means outputs the work support information to the notification means based on the rule of the rule storage means and the received work situation information.

[Invention 3] Furthermore, the work support system of Invention 3 is a work support system that communicably connects a device that is worn or carried by a worker, a server, and a work situation determination apparatus, for supporting work of the above-described worker, wherein the above-described server comprises: a rule generation means that generates a rule describing a determination condition of a work situation based on a manual describing procedures, contents, points of attention, or other matters of work; and a rule transmitting means that transmits the rule generated by the above-described rule generation means to the above-described work situation determination apparatus, the above-described work situation determination apparatus comprises: a rule receiving means that receives the above-described rule; a rule storage means that stores the rule received by the above-described rule receiving means; a signal input means that inputs an equipment signal indicating a state or operation of work object equipment from the work object equipment; a work situation determination means that determines the above-described work situation based on the equipment signal input by the above-described signal input means; and a work support information transmitting means that transmits the work support information to the above-described device based on the rule of the above-described rule storage means and a determination result of the above-described work situation determination means, and the above-described device comprises: a notification means; a work support information receiving means that receives the above-described work support information; and a work support information output means that outputs the work support information received by the above-described work support information receiving means to the above-described notification means.

According to such a configuration, in the server, the rule generation means generates the rule based on the manual, and the rule transmitting means transmits the generated rule to the work situation determination apparatus.

In the work situation determination apparatus, when the rule receiving means receives the rule, the received rule is stored in the rule storage means. In addition, the signal input means inputs the equipment signal from the work object equipment, and the work situation determination means determines the work situation based on the input equipment signal. Furthermore, the work support information transmitting means transmits the work support information to the device based on the rule of the rule storage means and the determination result.

In the device, when the work support information receiving means receives the work support information, the work support information output means outputs the received work support information to the notification means.

[Invention 4] Furthermore, the work support system of Invention 4 is a work support system that communicably connects a device that is worn or carried by a worker, and a server, for supporting work of the above-described worker, wherein the above-described server comprises: a rule generation means that generates a rule describing a determination condition of a work situation based on a manual describing procedures, contents, points of attention, or other matters of work; and a rule transmitting means that transmits the rule generated by the above-described rule generation means to the above-described device, and the above-described device comprises: a notification means; a rule receiving means that receives the above-described rule; a signal input means that inputs an equipment signal indicating a state or operation of work object equipment from the work object equipment; a work situation determination means that determines the above-described work situation based on the equipment signal input by the above-described signal input means; and a work support information output means that outputs the work support information to the above-described notification means based on the rule received by the above-described rule receiving means and a determination result of the above-described work situation determination means.

According to such a configuration, in the server, the rule generation means generates the rule based on the manual, and the rule transmitting means transmits the generated rule to the device.

In the device, when the rule receiving means receives the rule, the received rule is stored in the rule storage means. In addition, the signal input means inputs the equipment signal from the work object equipment, and the work situation determination means determines the work situation based on the input equipment signal. Furthermore, the work support information output means outputs the work support information to the notification means based on the rule of the rule storage means and the determination result.

[Invention 5] Furthermore, a work support system of Invention 5 is the work support system of any one of Invention 1 to Invention 4, comprising a work situation storage means that stores the above-described work situation in association with the above-described equipment signal, wherein the above-described work situation determination means refers to the above-described work situation corresponding to the above-described equipment signal from the above-described work situation storage means.

According to such a configuration, the work situation determination means refers to the work situation corresponding to the equipment signal from the work situation storage means.

In this regard, the work situation storage means stores the work situation (information indicating the work situation) by any means and at any time, and the work situation may be stored in advance, or the work situation may be stored by input from the outside or the like at the time of an operation of the present system without storing the work situation in advance. The work situation should be stored in the work situation storage means by being associated with the equipment signal (information indicating the equipment signal), and the equipment signal is not necessarily stored in the work situation storage means.

[Invention 6] Furthermore, a work support system of Invention 6 is the work support system of any one of Invention 1 to Invention 5, wherein the above-described object equipment comprises a signal output means that outputs the above-described equipment signal of a specification that is common among a plurality of pieces of the above-described object equipment.

According to such a configuration, in the object equipment, the signal output means outputs the equipment signal of the specification, which is common among the plurality of pieces of the object equipment.

[Invention 7] Furthermore, a work support system of Invention 7 is the work support system of any one of Invention 1 to Invention 5, wherein when a branching occurs in accordance with the above-described work situation, the above-described rule includes a plurality of the above-described rules related to the branching, and the work support system comprises a setting information storage means that stores setting information in which a work situation related to the above-described branching is set, and a manual revision means that generates or revises the above-described manual based on the above-described rule and the setting information of the above-described setting information storage means.

According to such a configuration, the manual revision means generates or revises the manual based on the plurality of rules related to the branching and the setting information of the setting information storage means.

In this regard, the setting information storage means stores the setting information by any means and at any time. The setting information may be stored in advance, or the setting information may be stored by an input from the outside or the like at the time of an operation of the present system without storing the setting information in advance.

[Invention 8] Furthermore, a work support system of Invention 8 is the work support system of any one of Invention 1 to Invention 5, wherein when a branching occurs in accordance with the above-described work situation, the above-described rule includes a plurality of the above-described rules related to the branching, and the work support system comprises a manual revision means that generates or revises the above-described manual based on all the above-described rules related to the above-described branching.

According to such a configuration, the manual revision means generates or revises the manual based on all the rules related to the branching.

[Invention 9] Furthermore, a work support system of Invention 9 is the work support system of any one of Invention 1 to Invention 5, Invention 7, and Invention 8, wherein the above-described rule generation means generates the above-described rule by associating elements that are terms, headings, texts, items, charts, figures, images, videos, or others included in the above-described manual, and wherein the work support system comprises an element change recording means that records changes in the above-described elements using a model case, and a learning means that optimizes the above-described rule such that the above-described model case gains the highest evaluation based on a recording result of the above-described element change recording means.

According to such a configuration, the rule generation means generates the rule by associating the elements that are terms, headings, texts, items, charts, figures, images, videos, or others included in the manual. Furthermore, the element change recording means records the changes in the elements using the model case, and the learning means optimizes the rule such that the model case gains the highest evaluation based on this recording result.

[Invention 10] Furthermore, a work support system of Invention 10 is the work support system of Invention 9, wherein the above-described work support information output means outputs the above-described work support information to the above-described notification means when the above-described work situation is determined to satisfy a determination condition of the above-described rule, and wherein the work support system comprises a rule change recording means that records changes in the above-described rule, and an evaluation information generation means that generates evaluation information on a work result using differences as compared to the rule optimized by the above-described learning means, based on a recording result of the above-described rule change recording means.

According to such a configuration, the work support information output means outputs the work support information when the work situation is determined to satisfy the determination condition of the rule. Furthermore, the rule change recording means records the changes in the rule, and the evaluation information generation means generates the evaluation information using the differences as compared to the optimized rule based on this recording result.

[Invention 11] Furthermore, a work support system of Invention 11 is the work support system of Invention 9 or Invention 10, comprising: a virtuality reproduction means that virtually reproduces the above-described work object and the above-described work situation that have changed due to an act of the above-described worker according to the rule generated by the above-described rule generation means; an optimization object selection means that presents differences from the highest evaluation for respective points of the changes reproduced by the above-described virtuality reproduction means, and selects, for each of constituting units or each of the above-described points of changes, whether to set this as an optimization object; and a second learning means that optimizes the above-described rule with the optimization object selected by the above-described optimization object selection means.

According to such a configuration, the virtuality reproduction means virtually reproduces the work situation that has changed due to an act of the worker according to the generated rule, and the optimization object selection means presents the differences from the highest evaluation for the respective points of the changes, and selects, for each of the constituting units or each of the points of changes, whether to set this as the optimization object. Furthermore, the second learning means optimizes the rule with the selected optimization object.

[Invention 12] On the other hand, in order to achieve the above-described objective, a work support server of Invention 12 is the above-described server in the work support system of any one of Invention 2 to Invention 4.

[Invention 13] On the other hand, in order to achieve the above-described objective, a work situation determination apparatus of Invention 13 is the above-described work situation determination apparatus in the work support system of Invention 2 or Invention 3.

[Invention 14] On the other hand, in order to achieve the above-described objective, a device for worker of Invention 14 is the above-described device in the work support system of any one of Invention 2 to Invention 4.

[Invention 15] On the other hand, in order to achieve the above-described objective, a work object equipment of Invention 15 is the above-described object equipment in the work support system of Invention 6.

Advantages of the Invention

As has been described above, according to the work support systems of Invention 1 to Invention 4, the work situation is determined based on the equipment signal indicating the state or operation of the work object equipment, without recognizing the work object and the work situation based on the sensor information from the device. Thus, processing loads can be reduced, and certainty and versatility can be improved, as compared to conventional techniques.

Furthermore, according to the work support system of Invention 2, since the device holds and operates the rule, communication loads between the work situation determination apparatus and the server, and between the device and the server, can be reduced. In addition, since the work situation determination apparatus determines the work situation, processing loads of the server and the device can be reduced.

Furthermore, according to the work support system of Invention 3, since the work situation determination apparatus holds and operates the rule, the communication loads between the work situation determination apparatus and the server, and between the device and the server, can be reduced. In addition, since the work situation determination apparatus determines the work situation, the processing loads of the server and the device can be reduced.

Furthermore, according to the work support system of Invention 4, since the device holds and operates the rule, the communication loads between the work situation determination apparatus and the server, and between the device and the server, can be reduced. In addition, since the device determines the work situation, the processing load of the server can be reduced.

Furthermore, according to the work support system of Invention 5, the processing load of determining the work situation can be reduced.

Furthermore, according to the work support system of Invention 6, a common rule can be applied regardless of types, versions, and the like of the object equipment by communalizing the signal specification by the signal output means.

Furthermore, according to the work support system of Invention 7, the manual including matters related to the branching can be generated or revised by setting the setting information.

Furthermore, according to the work support system of Invention 8, the manual including matters related to all branch destinations can be generated or revised.

Furthermore, according to the work support system of Invention 9, the rule is optimized such that the model case gains the highest evaluation, and thus it is possible to improve conformity to the rule.

Furthermore, according to the work support system of Invention 10, it is possible to obtain evaluation information that uses the model case as the standard.

Furthermore, according to the work support system of Invention 11, the rule is optimized in accordance with the actual work content of the worker, and thus it is possible to improve conformity to the rule.

BRIEF DESCRIPTION OF THE DRAWINGS

FIG. 7 is a figure illustrating a configuration example of a rule.

FIG. 10 is a sequence flow illustrating operations of object equipment 210 and the smart device 300.

FIG. 12 is a flow chart illustrating reconfiguration processing.

DESCRIPTION OF EMBODIMENTS

Hereinafter, an embodiment of the present invention will be described. FIG. 1 to FIG. 12 are figures illustrating the present embodiment.

Firstly, an outline of the present embodiment will be explained.

Figure 1:
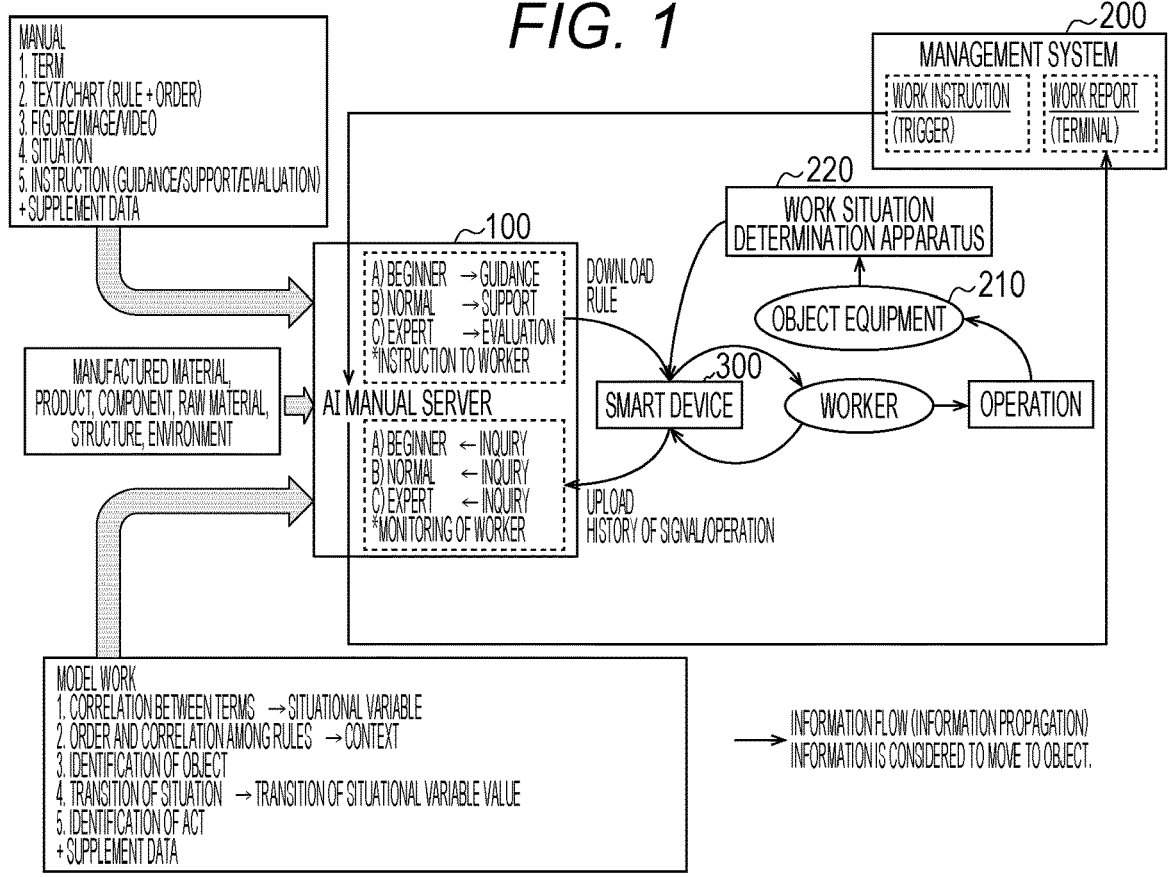
FIG. 1 is a figure for explaining an outline of the present embodiment.

FIG. 1 is a figure for explaining an outline of the present embodiment.

In the present embodiment, when a worker performs maintenance of equipment, facilities, and the like, the worker is provided with work support information indicating procedures, contents, points of attention, or other matters of work such that the work is supported. The worker wears a smart device 300 upon starting the work. Once a management system 200 transmits a work instruction to an AI manual server 100 as a trigger, the AI manual server 100 starts provision of the work support information to the worker through the smart device 300. Upon completion of the work, the AI manual server 100 creates a report of the work, and transmits the report to the management system 200.

The AI manual server 100 generates a rule describing a determination condition of a work object or a work situation (hereinafter, simply referred to as the "rule") based on a manual describing procedures, contents, points of attention, or other matters of the work, information related to manufactured materials, products, components, raw materials, structures, and environments, and model work information related to model work.

Furthermore, the AI manual server 100 determines a work situation regarding the object equipment 210, which is the work object, with a work situation determination apparatus 220, and when the determined work situation is determined to satisfy the determination condition of the rule, notifies the work support information through the smart device 300. In this manner, (1) determination of the work situation by the work situation determination apparatus 220, and (2) provision of information by an output to the smart device 300, are repeated until the worker completes the work.

In this regard, the work object refers to a thing to which a change is caused by an act of a worker. For example, (1) a worker himself/herself (for example, a worker when the worker moves a place), (2) a component (for example, a component when a worker takes out the component), (3) gloves (for example, gloves when a worker wears the gloves), (4) a tool (for example, a tool when a worker operates the tool in order to exchange a component), (5) equipment (for example, equipment when a worker exchanges a component of the equipment), (6) a grease (for example, a grease when a worker injects the grease into equipment using a tool), (7) a screen display (for example, a screen display when a worker operates equipment), and (8) a lamp (for example, a lamp when a worker operates equipment), fall under the work object.

In addition, the work situation refers to a surrounding of an object that passively changes due to an act of a worker, or a thing other than the "object" that is affected by the change in the "object". For example, (1) equipment itself in which a component is to be installed, (2) the position of equipment or a component as an object of an act, (3) the temperature, humidity, and sound in the surrounding of an object of an act, (4) the pulse, body temperature, and blood pressure of a worker himself/herself, (5) the position of a worker himself/herself, (6) lighting and extinguishing of a lamp, and (7) ringing of warning sound, fall under the work situation.

The AI manual server 100 classifies workers into three levels, e.g., "beginner", "normal", and "expert". The AI manual server 100 performs guidance on workers who are beginners, support on workers who are normal and more professional than the beginners, and evaluation on workers who are experts and more professional than those who are normal.

Figure 2:
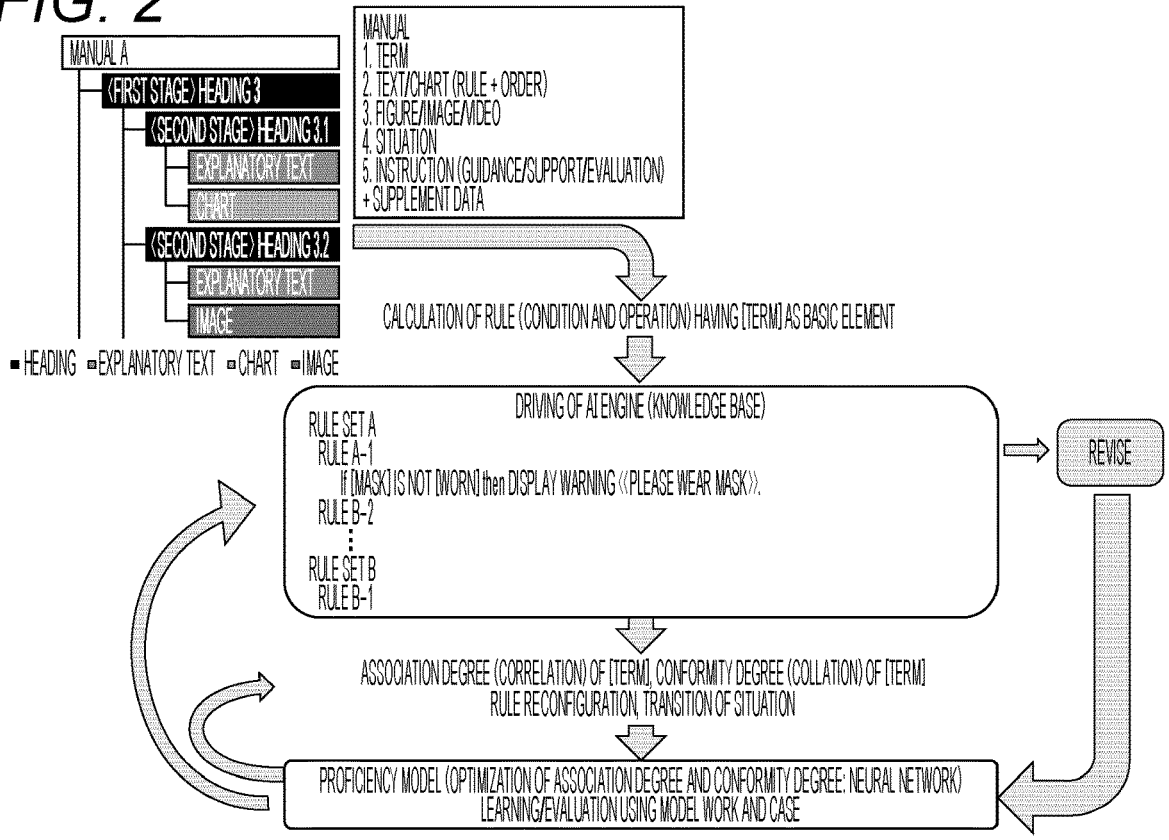
FIG. 2 is a figure for explaining a configuration of a rule having terms as elements.

FIG. 2 is a figure for explaining a configuration of a rule having terms as elements.

As illustrated in FIG. 2, the AI manual server 100 generates a rule by associating elements that are terms, headings, texts, items, charts, figures, images, videos, or others included in a manual, and records the generated rule as a knowledge base. The knowledge base will become basic information for driving an AI engine. In addition, the rule describes a determination condition having terms as elements, and the rule is optimized upon learning of a work content of a worker by an artificial intelligence (AI).

When processing is branched in accordance with a work situation, a plurality of rules corresponding to the branching are set. For example, when a worker is prompted to respond either "YES" or "NO" through the smart device 300, and the work support information to be displayed next is changed depending on the response result, a rule describing a determination condition as to whether the worker selected "YES" as the work situation and a rule describing a determination condition as to whether the worker selected "NO" as the work situation, are set.

Next, a configuration of the present embodiment will be explained.

Figure 3:
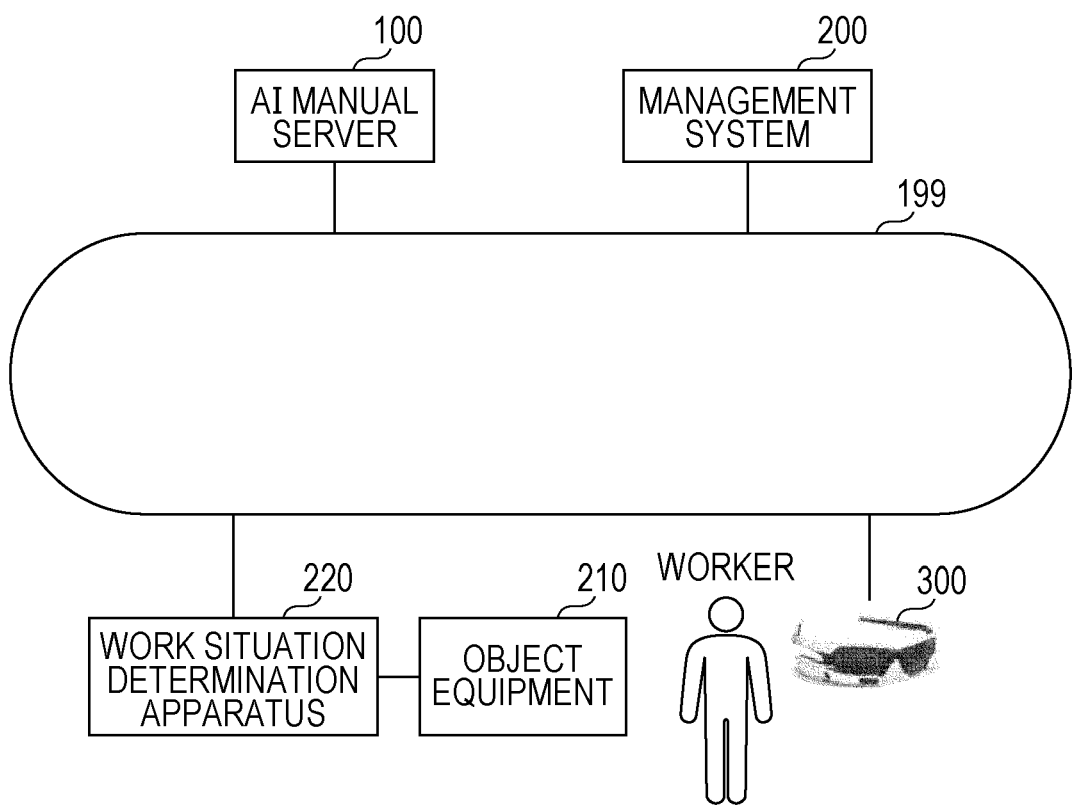
FIG. 3 is a block diagram illustrating a configuration of a network system related to the present embodiment.

FIG. 3 is a block diagram illustrating a configuration of a network system according to the present embodiment.

As illustrated in FIG. 3, the AI manual server 100, the management system 200, the work situation determination apparatus 220, and the smart device 300 are connected by Internet 199. The smart device 300 is connected to the Internet 199 by a wireless communication through a radio repeater (not illustrated).

The object equipment 210, which includes machine tools, trains, automobiles, and mining trucks, is connected to the work situation determination apparatus 220. A programmable logic controller (PLC) that outputs the equipment signal indicating a state or operation of the object equipment 210 is incorporated in the object equipment 210. This machine signal has a specification that is common among the plurality of pieces of the object equipment 210. By communalizing the signal specification (=term) by the PLC, a common rule can be applied regardless of types, versions, and the like. For example, there is no need to distinguish different colors of lamps by the object equipment 210, and the meaning of "lamp lighting" (signal specification) should be the same.

Next, a configuration of the work situation determination apparatus 220 will be explained.

The work situation determination apparatus 220 is made of a small computer such as Raspberry Pi, and is composed by bus-connecting a central processing unit (CPU), read only memory (ROM), random access memory (RAM), an interface (I/F), and the like, as in the hardware configuration illustrated in FIG. 5, which will be described later. A storage section that is composed of nonvolatile memory or the like is connected to the I/F.

The storage section stores the work situation information indicating the work situation regarding the object equipment 210, in association with the equipment signal information indicating the equipment signal of the object equipment 210.

The CPU inputs the equipment signal from the PLC of the object equipment 210, reads out the work situation information corresponding to the input equipment signal from the storage section, and transmits the readout work situation information to the smart device 300. For example, work situation information, "operation preparation signal reception", is transmitted with respect to an equipment signal, "operation preparation signal transmission", work situation information, "individual signal reception", is transmitted with respect to an equipment signal, "individual signal transmission", and work situation information, "activation signal reception", is transmitted with respect to an equipment signal, "activation signal transmission".

Next, a configuration of the smart device 300 will be explained.

Figure 4:
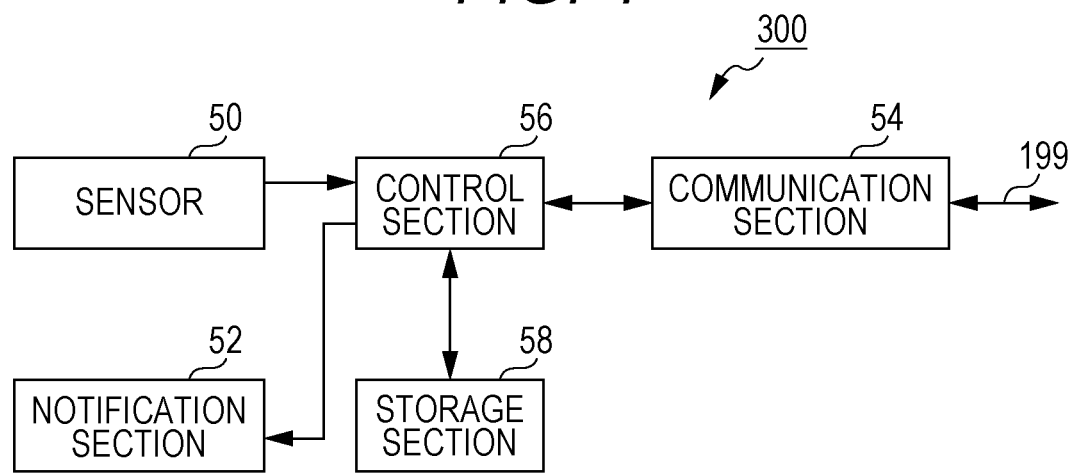
FIG. 4 is a functional block diagram of a smart device 300.

FIG. 4 is a functional block diagram of the smart device 300.

The smart device 300 is made of a smart glass, mixed reality (MR) device, or the like, and as illustrated in FIG. 4, the smart device 300 has a sensor 50, a notification section 52, a communication section 54, a control section 56, and a storage section 58. For example, when the smart device 300 is composed of a smart glass, work support information (images, figures, messages, etc.) can be displayed in a semi-transmissive manner (superimposed or overlaid) within the visual field of the worker.

The sensor 50 has an image sensor such as a camera, and when a worker wears the smart device 300, detects an image seen from a viewpoint of the worker as sensor information. In addition, the sensor 50 has a sound collection sensor such as a microphone, and detects a voice of the worker or other sounds in the surrounding as sensor information. In addition, the sensor 50 has a biosensor such as a pulse sensor, and detects bio-information such as the pupil, pulse, body temperature, and blood pressure of the worker as sensor information. In addition, the sensor 50 has an acceleration sensor or posture sensor, and detects body motions such as the position, orientation, and acceleration of the worker as sensor information. In addition, the sensor 50 has an environment sensor such as a temperature sensor, and detects environment information such as the temperature, humidity, electromagnetic force, and smell in the surrounding of the worker as sensor information. Furthermore, the sensor 50 outputs these detected pieces of sensor information to the control section 56.

The notification section 52 has a display part such as a display, a voice output part such as a speaker, and a vibrating part such as a vibrator, and notifies the work support information by display, voice, or vibration in accordance with control by the control section 56.

The communication section 54 performs data communication according to the standard of wireless communication, and requests transmission of information to a server or the like through the Internet 199. Furthermore, the communication section 54 receives information that is transmitted from the server or the like, and outputs the information to the control section 56.

The control section 56 is composed by bus-connecting a CPU, an ROM, an RAM, an I/F, and the like as in the hardware configuration illustrated in FIG. 5, which will be described later.

The storage section 58 is composed of nonvolatile memory or the like, and stores rules that are required at the time of operations.

Next, a configuration of the AI manual server 100 will be explained.

Figure 5:
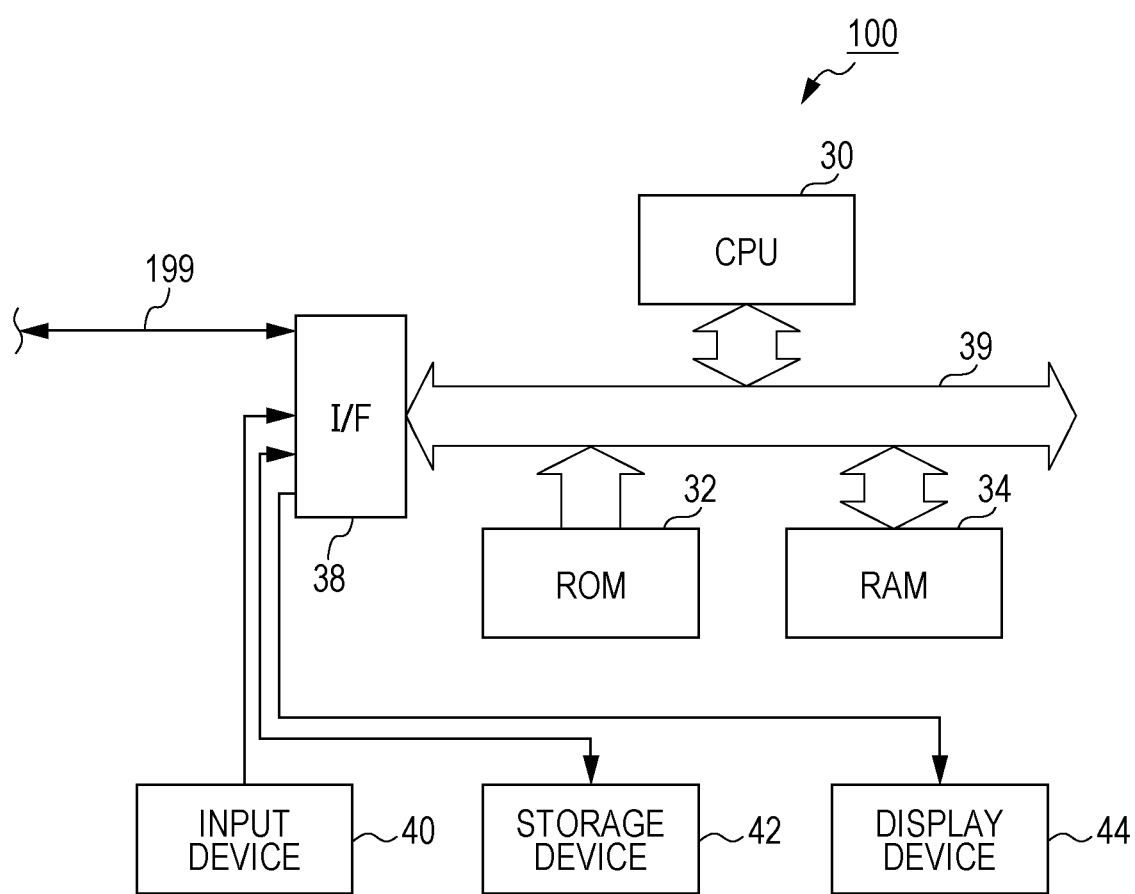
FIG. 5 is a figure illustrating a hardware configuration of an AI manual server 100.

FIG. 5 is a figure illustrating a hardware configuration of the AI manual server 100.

As illustrated in FIG. 5, the AI manual server 100 is composed of a CPU 30 that controls arithmetic calculation and an entire system based on a control program, an ROM 32 that stores the control program or the like of the CPU30 in a prescribed region in advance, an RAM 34 that stores data read out from the ROM 32 or the like and the result of arithmetic calculation that is necessary in the process of arithmetic calculation of the CPU 30, and an I/F 38 that mediates input and output of data to an external device, and these are mutually connected in a manner capable of transferring data by a bus 39 that is a signal line for transferring data.

The I/F 38 is connected to an input device 40 consisting of a keyboard, a mouse, and the like that are capable of inputting data as human interfaces, a storage device 42 that stores data, table, and the like as files, a display device 44 that displays a screen based on an image signal, and a signal line for connection to the Internet 199, as external devices.

Next, a data structure of the storage device 42 will be explained.

The storage device 42 stores a manual and a term table. The manual is, for example, an existing manual such as a maintenance manual, and the manual includes elements that are terms, headings, texts, items, charts, figures, images, videos, or others. One or multiple terms are registered in the term table.

In addition, the storage device 42 stores internal data of the AI engine (hereinafter, simply referred to as the "internal data"). The internal data includes a knowledge base, term conformity degree information, condition association degree information, constitution association degree information, object identification information, situation identification information, an inquiry response module, a guidance instruction module, an evaluation learning module, a reconfiguration module, and a multi-language module.

The knowledge base is basic information for driving the AI engine, that is generated from the manual. The basic information is an aggregation of rules composed of a condition part and an action part. Behavior of the AI engine is controlled per constituent (work item) unit.

The term conformity degree information is information for determining conformity to a term (this is different from term identification information, which is for identifying a term). For example, conformity to a term [close] includes a change in an object before and after an act of a worker.

The condition association degree information is information on the strength of association among the object, the situation, and the condition of work described in the manual. For example, in the case of an essential condition, the strength of association with the instruction is "1". Regarding the object, the situation, and the condition of work that completely have no association, the strength of association is "0".

The constitution association degree information is information on the strength of association among constituting units described in the manual. For example, the association among constituting units in which the order of work is predetermined is "1", while the association degree among items that are in random order is "0".

The object identification information is identification information for identifying a work object when determining conformity to a term. For example, in the case of a term [component A], this information is used to identify the component A, and also identify the orientation and position of the component A.

The situation identification information is identification information for identifying a work situation when determining conformity to a term. For example, a situation A is indicated by multiple terms or a combination of values of those terms. A rule itself to be applied will be selected.

The inquiry response module is information and processing for responding to an inquiry from a worker. A response will be made to the inquiry from the worker.

The guidance instruction module is information and processing for guiding a worker with texts, voices, videos, or vibrations. A text, voice, video, or vibration that is associated with the term will be presented to the worker.

The evaluation learning module records a transition in values of conformity degree or association degree caused by work, and performs comparison and evaluation with respect to a model work. In addition, internal data will be optimized using this record as a model case.

The reconfiguration module configures a manual from internal data. For example, the reconfiguration module reconfigures and outputs the internal data as the manual, and after revision, captures differences into the internal data.

The multi-language module is information and processing for associating a term to a language other than Japanese. For example, the multi-language module makes a conversion into a native language of a worker when performing inquiry and response or giving guidance instruction to the worker.

Next, operations in the present embodiment will be explained.

Firstly, operations in the case of executing initial processing with the AI manual server 100 will be explained.

Figure 6:
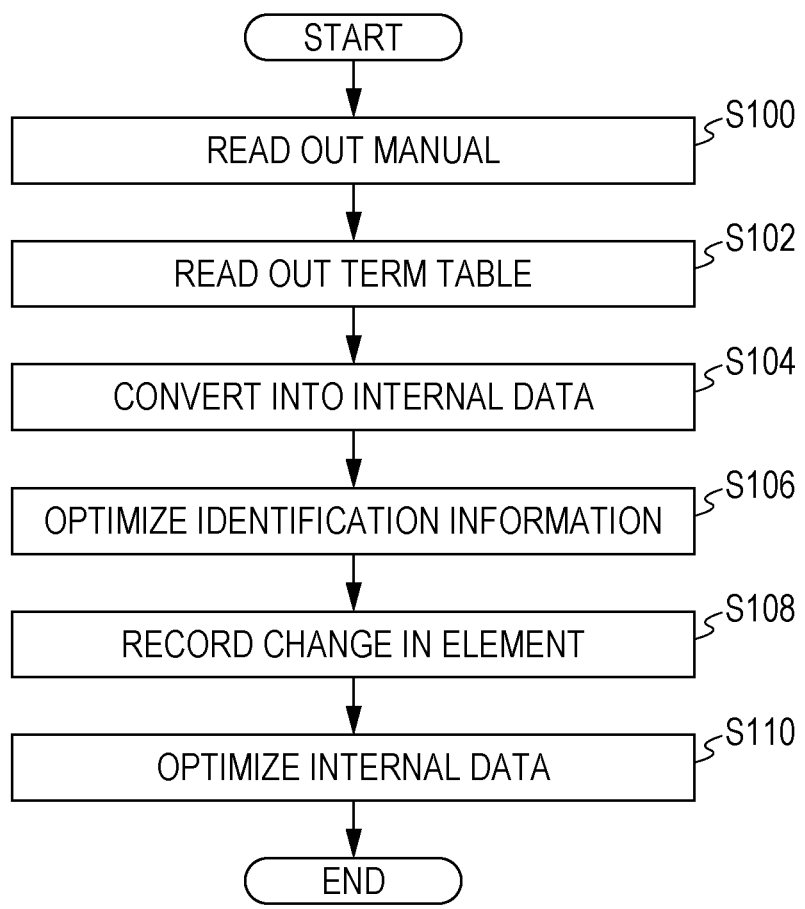
FIG. 6 is a flow chart illustrating initial processing.

FIG. 6 is a flow chart illustrating initial processing.

The CPU 30 consists of a micro-processing unit (MPU) and the like. The CPU 30 activates a prescribed program stored in the storage device 42, and executes the initial processing illustrated in the flow chart of FIG. 6 according to that program.

The initial processing is processing that is executed when configuring the AI engine. When the initial processing is executed in the CPU 30, firstly, a shift is made to Step S100 as illustrated in FIG. 6.

In Step S100, a manual is read out from the storage device 42, and a shift is made to Step S102 in which a term table is read out from the storage device 42. Then, a shift is made to Step S104.

In Step S104, terms are extracted from the manual based on the term table that was read out, and elements that are terms, headings, texts, items, charts, figures, images, videos, or others included in the manual are associated to generate a rule, followed by conversion into internal data, based on condition association degree information, constitution association degree information, and the like.

FIG. 7 is a figure illustrating a configuration example of a rule.

The rule describes a determination condition having the extracted terms as elements, and processing to be executed when a work object or a work situation satisfies this determination condition.

In the example of FIG. 7, the rule, "if [body temperature] is [abnormal] then [notify] [manager] of [abnormality] of 'worker's body'", means that when the body temperature of the worker is determined to be abnormal based on the sensor information of the smart device 300, processing of notifying the manager of the abnormality in the worker's body will be executed. In this regard, the terms in [ ] in the rule are the terms that were registered in the term table and extracted from the manual.

In addition, the rule, "if not [worker] [wear] [gloves] then [instruct] [worker] to [wear] [gloves]", means that when the worker is determined to be not wearing gloves based on the sensor information of the smart device 300, processing of transmitting work support information for instructing the worker to wear gloves to the smart device 300 will be executed.

Next, a shift is made to Step S106 in which term identification information, object identification information, and situation identification information are optimized using supplement data (information and the like from other systems). Then, a shift is made to Step S108 in which changes in the elements according to a model case are recorded as internal data, and a shift is made to Step S110.

In Step S110, the internal data (rule) is optimized such that the model case gains the highest evaluation based on this recording result. Specifically, machine learning is performed with input of multiple model cases, and optimization learning is performed based on the relationships among the learned cases. Upon completion of the processing in Step S110, the series of processing are completed.

Next, operations in the case of executing work support processing with the AI manual server 100 and the smart device 300 will be explained.

Figure 8:
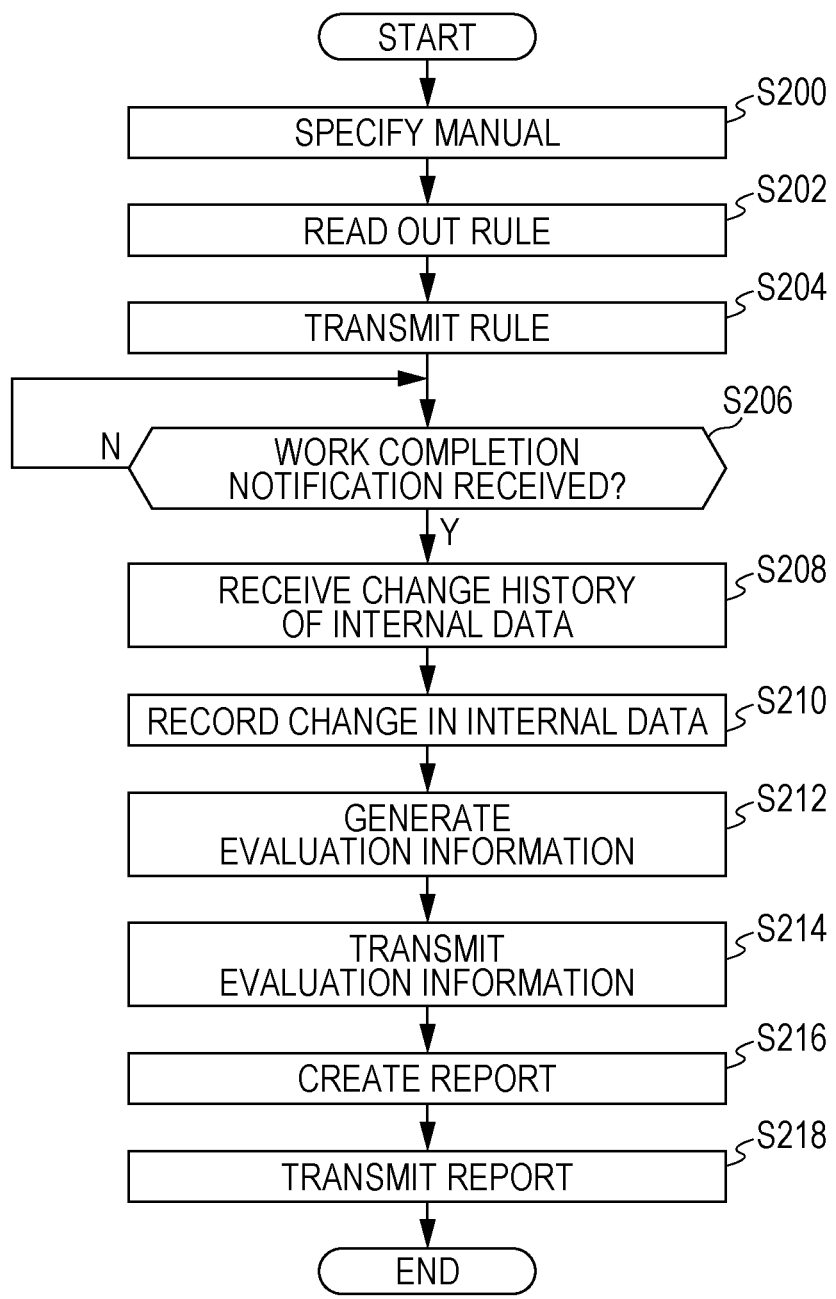
FIG. 8 is a flow chart illustrating work support processing executed by the AI manual server 100.

FIG. 8 is a flow chart illustrating work support processing executed in the AI manual server 100.

In the AI manual server 100, the CPU 30 activates a prescribed program (guidance instruction module) stored in the storage device 42, and executes the work support processing illustrated in the flow chart of FIG. 8 according to that program.

The work support processing is processing to be executed when a worker performs work. When the work support processing is executed in the CPU 30, firstly, a shift is made to Step S200 as illustrated in FIG. 8.

In Step S200, a manual related to the work performed by the worker is specified, and a shift is made to Step S202 in which the rule corresponding to the specified manual is read out from the storage device 42. Then, a shift is made to Step S204 in which the readout rule is transmitted to the smart device 300.

Figure 9:
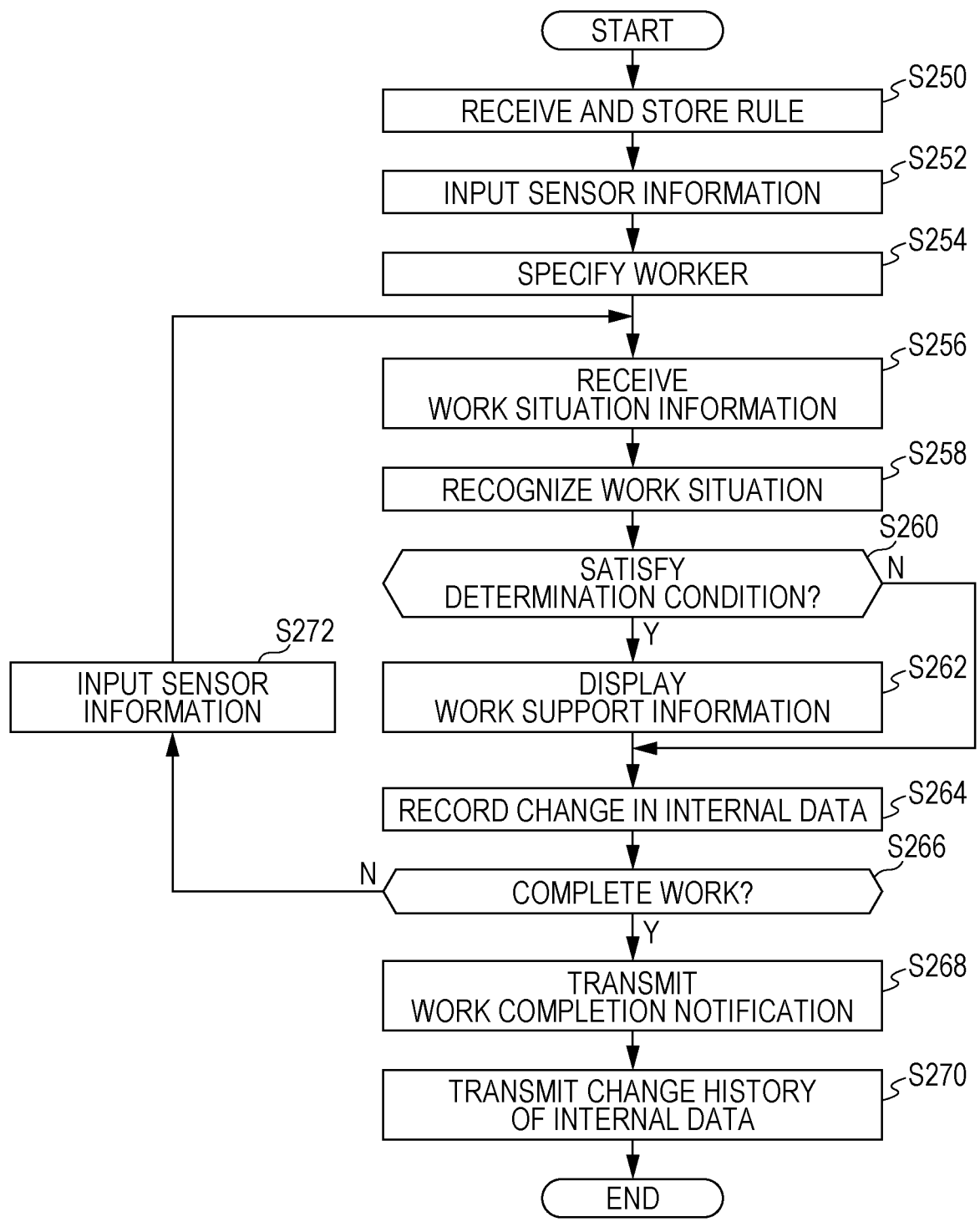
FIG. 9 is a flow chart illustrating work support processing executed by the smart device 300.

FIG. 9 is a flow chart illustrating work support processing executed in the smart device 300.

In the smart device 300, the control section 56 activates a prescribed program stored in the ROM, and executes the work support processing illustrated in the flow chart of FIG. 9 according to that program.

The work support processing is processing to be executed when a worker performs work. When the work support processing is executed in the control section 56, firstly, a shift is made to Step S250 as illustrated in FIG. 9.

In Step S250, a rule is received from the AI manual server 100, and the received rule is stored in the storage section 58. Then, a shift is made to Step S252 in which sensor information is input from the sensor 50, and a shift is made to Step S254 in which a worker is specified based on the input sensor information. Then, a shift is made to Step S256.

In Step S256, the work situation information is received from the work situation determination apparatus 220 corresponding to the object equipment 210, and a shift is made to Step S258 in which a work situation such as a response to the work support information to be displayed in Step S262 is recognized based on the sensor information input in Steps S252, S272. Then, a shift is made to Step S260.

In Step S260, whether the work situation related to the work situation information received in Step S256 or the work situation recognized in Step S258 satisfies the determination condition of the rule is determined based on the rule of the storage section 58. When it is determined that the work situation satisfies the determination condition (YES), a shift is made to Step S262 in which processing of displaying the work support information on the notification section 52 and other kinds of processing described in the determination condition are executed, and a shift is made to Step S264.

In Step S264, changes in the internal data (rule) are recorded in the storage section 58. Then, a shift is made to Step S266 in which determination is made as to whether the work has completed, and when it is determined that the work has completed (YES), a shift is made to Step S268.

In Step S268, a work completion notification, which is a notification that the work has completed, is transmitted to the AI manual server 100. Then, a shift is made to Step S270 in which a change history of the internal data recorded in the storage section 58 is transmitted to the AI manual server 100, and the series of processing are completed.

On the other hand, when it is determined that the work has not been completed (NO) in Step S266, a shift is made to Step S272 to input sensor information from the sensor 50, and then a shift is made to Step S256.

On the other hand, when it is determined that the work situation does not satisfy the determination condition (NO) in Step S260, a shift is made to Step S264.

Figure 10:
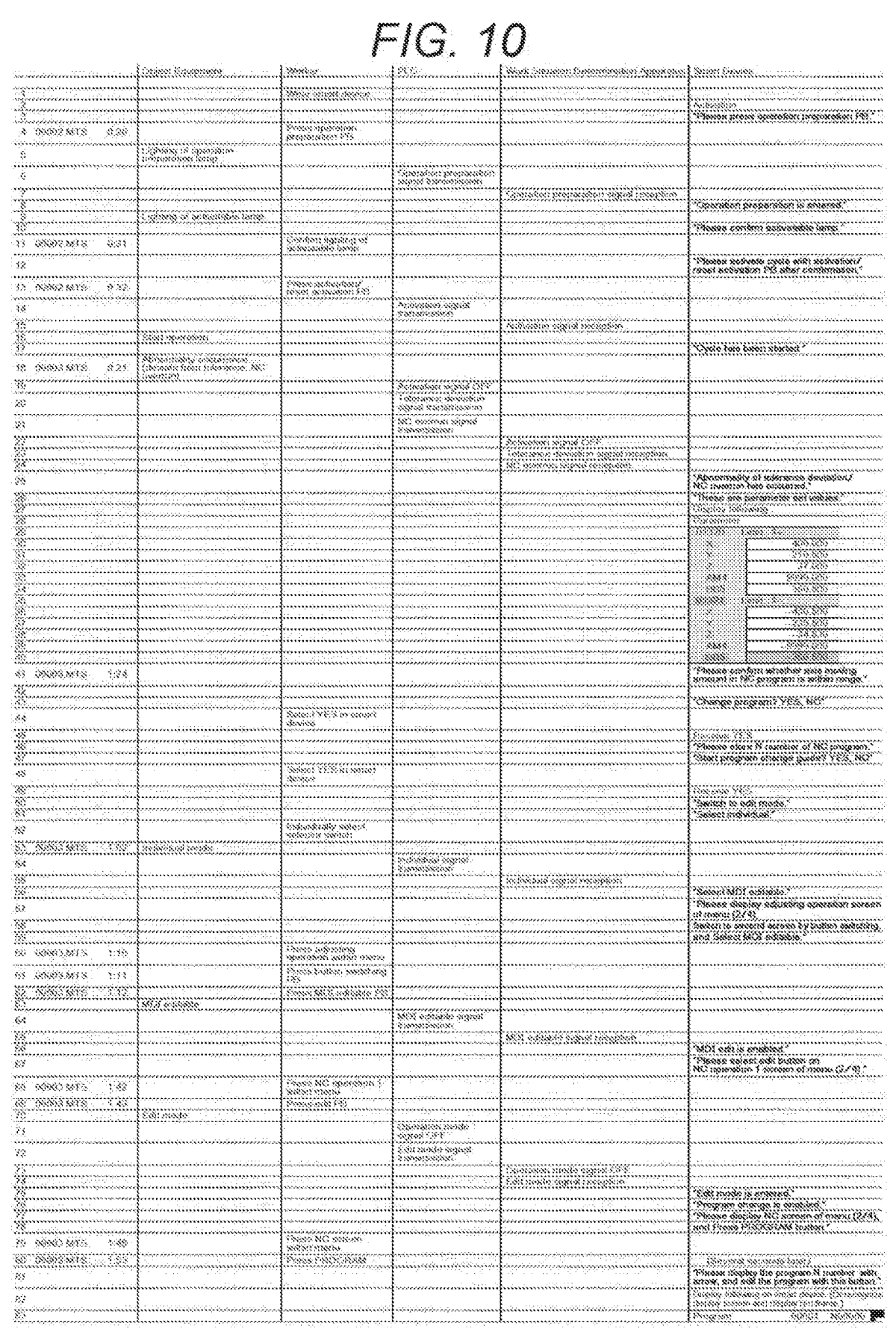

FIG. 10 is a sequence flow illustrating operations of the object equipment 210 and the smart device 300.

In the example of FIG. 10, when the worker wears the smart device 300, the smart device 300 is activated, and "Please press operation preparation PB" is displayed (lines 1-3).

Next, when the worker presses the operation preparation PB of the object equipment 210, an operation preparation lamp of the object equipment 210 is lighted, and the equipment signal indicating "operation preparation signal transmission" is output from the PLC of the object equipment 210. In the work situation determination apparatus 220, when the equipment signal is input, the work situation information indicating "operation preparation signal reception" is output. In the smart device 300, when the work situation information is received, whether the work situation satisfies the determination condition of the rule is determined, and "Operation preparation is entered" is displayed (lines 4-8).

Then, when an activatable lamp of the object equipment 210 is lighted, "Please confirm the activatable lamp", is displayed on the smart device 300 by the same process as that described above. The worker confirms the lighting of the activatable lamp with this display. Then, when the worker presses an activation/reset activation PB of the object equipment 210, the equipment signal indicating "activation signal transmission" is output from the PLC of the object equipment 210. In the work situation determination apparatus 220, the work situation information indicating "activation signal reception" is output when the equipment signal is input. Furthermore, once the operation of the object equipment 210 has been started, "Cycle has been started", is displayed on the smart device 300 by the same process as that described above (lines 9-17).

Next, an operation example of branching will be explained.

"Please confirm whether axis moving amount in NC program is within range", and "Change program? YES, NO", are displayed on the smart device 300. At this time, the storage section 58 stores a rule describing a determination condition as to whether the worker selected "YES", and a rule describing a determination condition as to whether the worker selected "NO" as the work situation. When the worker selects "YES" in the smart device 300 with respect to this display, it is determined that the determination condition as to whether "YES" is selected is satisfied. Thus, "Please store N number of NC program" is displayed on the smart device 300 (lines 41-46).

On the other hand, in the AI manual server 100, a shift is made to Step S206, and whether the work completion notification is received from the smart device 300 is determined. When it is determined that the work completion notification has been received (YES), a shift is made to Step S208 in which a change history of internal data is received from the smart device 300. Then, a shift is made to Step S210 in which changes in the internal data (rule) are recorded based on the change history of the received internal data, and a shift is made to Step S212.

In Step S212, evaluation information on a work result is generated using differences as compared to the optimized internal data (rule), based on the recording result in Step S210. Then, a shift is made to Step S214 in which the generated evaluation information is transmitted to the smart device 300, and a shift is made to Step S216.

In Step S216, a report on the work is created by inserting the evaluation information generated in Step S212 into a template of the report. Then, a shift is made to Step S218 in which the created report is transmitted to the management system 200, and the series of processing are completed.

On the other hand, when it is determined that the work completion notification has not been received in Step S206 (NO), the processing stays at Step S206 until the work completion notification is received.

Next, operations in the case of executing proficiency processing with the AI manual server 100 will be explained.

Figure 11:
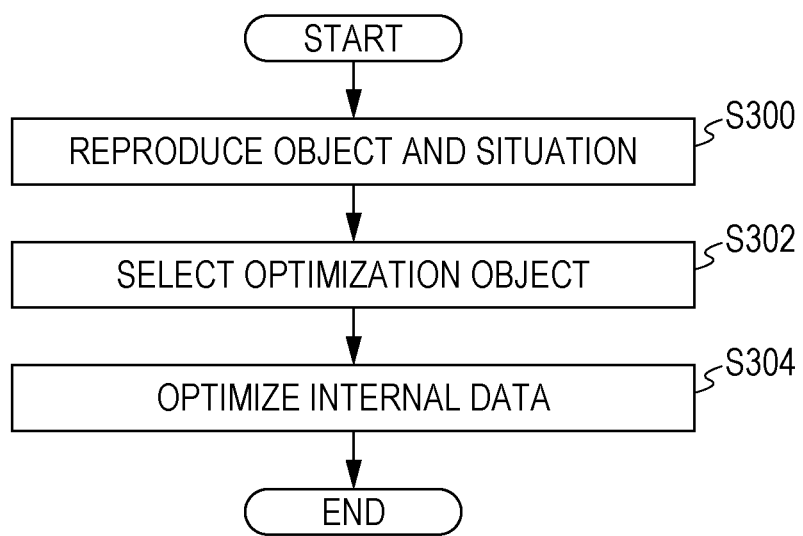
FIG. 11 is a flow chart illustrating proficiency processing.

FIG. 11 is a flow chart illustrating the proficiency processing.

The CPU 30 activates a prescribed program (evaluation learning module) stored in the storage device 42, and executes the proficiency processing illustrated in the flow chart of FIG. 11 according to that program.

The proficiency processing is processing to be executed when learning a work content of a worker. When the proficiency processing is executed in the CPU 30, firstly, a shift is made to Step S300 as illustrated in FIG. 11.

In Step S300, the work object and the work situation that have changed due to an act of the worker are virtually reproduced according to the internal data (rule), and a shift is made to Step S302 in which differences from the highest evaluation for respective points of the reproduced changes are displayed on the display device 44, and an operator or the like is allowed to select, for each of constituting units or each of the points of changes, whether to set this as an optimization object. Then, a shift is made to Step S304.

In Step S304, the internal data (rule) is optimized with the selected optimization object. Specifically, machine learning is performed with input of work cases in the past, and optimization learning is performed based on the relationships among added/existing cases. Upon completion of the processing in Step S304, the series of processing are completed.

Next, operations in the case of executing reconfiguration processing with the AI manual server 100 will be explained.

FIG. 12 is a flow chart illustrating the reconfiguration processing.

The CPU 30 activates a prescribed program (reconfiguration module) stored in the storage device 42, and executes the proficiency processing illustrated in the flow chart of FIG. 12 according to that program.

The proficiency processing is processing to be executed when reconfiguring the AI engine. When the proficiency processing is executed in the CPU 30, firstly, a shift is made to Step S400 as illustrated in FIG. 12.

In Step S400, the manual is revised as data in the form of a manual that is readable by humans and that is re-capturable, based on the optimized internal data (rule). In addition, when the processing is branched in accordance with the work situation, the manual is revised based on all rules related to the branching. Furthermore, when the processing is branched in accordance with the work situation, the manual can also be revised by setting a value that is assumed at a branching point. Setting information in which product versions, times, meter values, and other work situations related to the branching are set is stored in the storage device 42, and the manual is revised based on the rules and the setting information of the storage device 42.

Then, a shift is made to Step S402 in which the operator or the like is allowed to confirm inclusion of new elements and presence of differences based on the revised manual, and a shift is made to Step S404.

In Step S404, relevant constituting units or points of changes are displayed on the display device 44 as insufficient parts, based on a confirmation result in Step S402. Then, a shift is made to Step S406 in which internal data (rule) is recorded based on a work result concerning the insufficient parts, and a shift is made to Step S408.

In Step S408, the work object and the work situation that have changed due to the act of the worker are virtually reproduced according to the recorded internal data (rule). Then, a shift is made to Step S410 in which differences from the highest evaluation for respective points of the reproduced changes are displayed on the display device 44, and the operator or the like is allowed to select, for each of constituting units or each of the points of changes concerning the insufficient parts, whether to set this as an optimization object, and a shift is made to Step S412.

In Step S412, the internal data (rule) is optimized with the selected optimization object. Specifically, machine learning and optimization learning are performed with input of a model case of a part concerned or internally generated data that is equivalent to such a case. Upon completion of the processing in Step S304, the series of processing are completed.

Next, effects of the present embodiment will be explained.

In the present embodiment, the rule describing the determination condition of the work situation is generated based on the manual, and the work situation is determined based on the equipment signal indicating the state or operation of the object equipment 210. Based on the rule and the determined work situation, the work support information is notified with the smart device 300.

In this manner, the work situation is determined based on the equipment signal indicating the state or operation of the object equipment 210 without recognizing the work object and the work situation based on the sensor information from the smart device 300. Thus, processing loads can be reduced, and versatility can be improved, as compared to conventional techniques. In addition, there is no uncertainty of recognition in transmission and reception of the equipment signal with the object equipment 210. For example, lighting of the lamp can be certainly recognized with a "lamp lighting" signal from the object equipment 210. Accordingly, by determining the work situation based on the equipment signal, certainty of the recognition concerning the work situation can be improved as compared to conventional techniques.

Furthermore, in the present embodiment, the AI manual server 100 transmits the rule to the smart device 300. The smart device 300 receives the rule, and stores this in the storage section 58. The smart device 300 receives the work situation information from the work situation determination apparatus 220, and displays the work support information on the notification section 52 based on the rule of the storage section 58 and the received work situation information.

In this manner, since the smart device 300 holds and operates the rule, communication loads between the work situation determination apparatus 220 and the AI manual server 100, and between the smart device 300 and the AI manual server 100, can be reduced. In addition, since the work situation determination apparatus 220 determines the work situation, processing loads of the AI manual server 100 and the smart device 300 can be reduced.

Furthermore, in the present embodiment, the work situation determination apparatus 220 comprises the storage section, which stores the work situation information indicating the work situation regarding the object equipment 210 in association with the equipment signal information indicating the equipment signal of the object equipment 210. The equipment signal is input from the PLC of the object equipment 210. The work situation information corresponding to the input equipment signal is read out from the storage section, and the readout work situation information is transmitted to the smart device 300.

In this manner, the processing load of determining the work situation can be reduced.

Furthermore, in the present embodiment, the object equipment 210 comprises the PLC, which outputs the equipment signal of a specification that is common among the plurality of pieces of the object equipment 210.

In this manner, by communalizing the signal specification, a common rule can be applied regardless of types, versions, and the like of the object equipment 210.

Furthermore, in the present embodiment, when a branching occurs in accordance with the work situation, the rule includes a plurality of rules related to the branching, and the manual is revised based on the setting information in which the work situation related to the branching is set, and the rules.

In this manner, the manual including the matters related to the branching can be revised by setting the setting information.

Furthermore, in the present embodiment, when a branching occurs in accordance with the work situation, the rule includes a plurality of rules related to the branching, and the manual is revised based on all the rules related to the branching.

In this manner, the manual including the matters related to all branch destinations can be revised.

Furthermore, in the present embodiment, the rule is generated by associating elements that are terms, headings, texts, items, charts, figures, images, videos, or others included in the manual. Changes in the elements are recorded using a model case, and the internal data (rule) is optimized such that the model case gains the highest evaluation based on this recording result.

In this manner, since the rule is optimized such that the model case gains the highest evaluation, conformity to the rule can be improved.

Furthermore, in the present embodiment, when it is determined that the work situation satisfies the determination condition of the rule, the work support information is notified with the smart device 300, and changes in the internal data (rule) are recorded. Based on this recording result, evaluation information on a work result is generated using differences as compared to the optimized internal data (rule).

In this manner, the evaluation information that uses the model case as the standard can be obtained.

Furthermore, in the present embodiment, the work object and the work situation that have changed due to the act of the worker are virtually reproduced according to the internal data (rule), and the differences from the highest evaluation for respective points of the reproduced changes are presented. For each of the constituting units or each of the points of changes, whether to set this as the optimization object is selected, and the internal data (rule) is optimized with the selected optimization object.

In this manner, since the rule is optimized in accordance with the actual work content of the worker, it is possible to improve conformity to the rule.

Furthermore, in the present embodiment, the manual is revised based on the optimized internal data (rule), and the inclusion of new elements and the presence of differences are confirmed based on the revised manual. Based on this confirmation result, the relevant constituting units or points of changes are presented as the insufficient parts, and the internal data (rule) is recorded based on the work result concerning the insufficient parts. The work object and the work situation that have changed due to the act of the worker are virtually reproduced according to the recorded internal data (rule). The differences from the highest evaluation for the respective points of the reproduced changes are presented, and for each of the constituting units or each of the points of changes concerning the insufficient parts, whether to set this as the optimization object is selected. The internal data (rule) is optimized with the selected optimization object.

In this manner, the insufficient parts are analyzed based on the revised manual, and the rule is optimized based on this analysis result. Thus, it is possible to improve conformity to the rule.

In the present embodiment, the storage device 42 corresponds to the setting information storage means of Invention 7; the PLC corresponds to the signal output means of Invention 6; the work situation determination apparatus 220 corresponds to the work situation determination means of Invention 1, 2, or 5; and the smart device 300 corresponds to the device of Invention 1, 2, or 14. In addition, the notification section 52 corresponds to the notification means of Invention 1, 2, or 10; the storage section 58 corresponds to the rule storage means of Invention 2; Step S104 corresponds to the rule generation means of Invention 1, 2, 9, or 11; and Step S108 corresponds to the element change recording means of Invention 9.

In addition, in the present embodiment, Step S110 corresponds to the learning means of Invention 9 or 10; Step S204 corresponds to the rule transmitting means of Invention 2; Step S250 corresponds to the rule receiving means of Invention 2; and Step S256 corresponds to the work situation information receiving means of Invention 2. Furthermore, Steps S260, S262 correspond to the work support information output means of Invention 1, 2, or 10; Step S210 corresponds to the rule change recording means of Invention 10; Step S212 corresponds to the evaluation information generation means of Invention 10; and Step S300 corresponds to the virtuality reproduction means of Invention 11.

In addition, in the present embodiment, Step S302 corresponds to the optimization object selection means of Invention 11; Step S304 corresponds to the second learning means of Invention 11; and Step S400 corresponds to the manual revision means of Invention 7 or 8.

Modification Example

It should be noted that although the processing in Step S400 was configured to revise the manual in the above-described embodiment, not limited thereto, the processing can also be configured to generate a new manual.

In addition, although the above-described embodiment and its modification example were configured such that the smart device 300 holds and operates the rule, not limited thereto, they may be configured such that the work situation determination apparatus 220 holds and operates the rule. A specific configuration thereof is as follows.

The AI manual server 100 transmits a rule to the work situation determination apparatus 220.

The work situation determination apparatus 220 receives the rule, and stores this in the storage section. Further, the work situation determination apparatus 220 inputs the equipment signal from the object equipment 210, determines the work situation based on the input equipment signal, and transmits the work support information to the smart device 300 based on the rule of the storage section and the determined work situation.

The smart device 300 receives the work support information, and displays the received work support information on the notification section 52.

In this manner, since the work situation determination apparatus 220 holds and operates the rule, the communication loads between the work situation determination apparatus 220 and the AI manual server 100, and between the smart device 300 and the AI manual server 100, can be reduced. In addition, since the work situation determination apparatus 220 determines the work situation, the processing loads of the AI manual server 100 and the smart device 300 can be reduced.

In addition, although the above-described embodiment and its modification example were configured by providing the work situation determination apparatus 220, not limited thereto, they may be configured such that the work situation is determined by the smart device 300 without providing the work situation determination apparatus 220. A specific configuration thereof is as follows.

The AI manual server 100 transmits the rule to the smart device 300.

The smart device 300 receives the rule, and stores this in the storage section 58. The smart device 300 inputs the equipment signal from the object equipment 210, determines the work situation based on the input equipment signal, and displays the work support information on the notification section 52 based on the rule of the storage section 58 and the determined work situation.

In this manner, since the smart device 300 holds and operates the rule, the communication loads between the work situation determination apparatus 220 and the AI manual server 100, and between the smart device 300 and the AI manual server 100, can be reduced. In addition, since the smart device 300 determines the work situation, the processing load of the AI manual server 100 can be reduced.

In addition, although a case in which the smart device 300 falls into an environment that is incapable of communicating with the Internet 199 was not particularly explained in the above-described embodiment or its modification example, it is also possible to configure the smart device 300 such that it automatically operates when falling into an environment incapable of communication.

In addition, in the above-described embodiment and its modification example, the PLC is incorporated in the object equipment 210 as equipment that outputs the equipment signal indicating the state or operation of the object equipment 210. However, not limited thereto, equipment that realizes the same function as the PLC such as a micro controller unit (MCU) may also be incorporated.

In addition, the above-described embodiment and its modification example explained cases in which the program stored in the storage device 42 in advance is executed when executing the processing illustrated in the flow charts of FIG. 6, FIG. 8, FIG. 11, and FIG. 12. However, not limited thereto, the RAM 34 may read a program indicating those procedures from a storage medium storing that program, and execute the program.

In addition, in the above-described embodiment and its modification example, the present invention was applied to cases in which a worker performs maintenance of equipment, facilities, and the like. However, not limited thereto, the present invention can also be applied to other cases without departing from the scope of the present invention. For example, the present invention can also be applied to the cases of performing assembly work, clerical work, and other kinds of work.

DESCRIPTION OF REFERENCE CHARACTERS

100 AI manual server
30 CPU
32 ROM
34 RAM
38 I/F
39 bus
40 input device
42 storage device
44 display device
200 management system
210 object equipment
220 work situation determination apparatus
300 smart device
50 sensor
52 notification section 54 communication section
56 control section
58 storage section
199 Internet

The invention claimed is:

1. A computer implemented method for work support, the method comprising:

extracting from a term table by execution of an artificial intelligence server, messages, images and figures of a procedures' manual;

generating, a rule by associating the messages, the images and the figures of the procedures' manual to describe a determination condition of a work situation based on the procedures' manual, wherein the work situation describes: equipment installation, a position of the equipment as an object, temperature surrounding the equipment, and a body temperature of a worker acting on the equipment;

receiving, from the artificial intelligence server, the rule describing the work situation according to the procedures' manual and according to a signal of the equipment object indicating an operation state of work on the equipment object;

converting said rule into an internal data rule based on a degree of constitution association and a degree of condition association, wherein the degree of the constitution association ranges from a random work order to a predetermined work order, and wherein the degree of the condition association ranges from an essential association among the work situation, the equipment object and the determination work condition described in the procedures' manual, to a no association among the work situation, the equipment object, and the determination work condition;

inputting temperature information from a bio-information sensor of a smart device worn by the worker;

identifying a worker based on the bio-information sensor;

determining, by a work situation apparatus distinct from the artificial intelligence server, the work situation corresponding to the equipment object, to reduce processing loads of the artificial intelligence server;

receiving, by the artificial intelligence server from the work situation apparatus, the work situation corresponding to the equipment object;

detecting that the determination work condition is satisfied;

recording change results in the internal data rule;

virtually reproducing, according to the internal data rule, the recorded change results of the equipment object and the work situation due to the worker acting on the equipment object;

displaying work support information, comprising the extracted messages, images and figures superimposed or overlaid within a visual field of the worker;

performing machine learning with input from multiple model cases based on the recorded change results;

optimizing, based on the recorded change results, the internal data rule by performing machine learning selection, among multiple learned model cases, of a model case that gained a highest evaluation among the recorded change results in the internal data rule;

presenting differences from the highest evaluation to respective points of the virtually reproduced change results;

inputting additional sensor information from the bio-information sensor comprising one or more of: pulse and blood pressure of the worker;

repeating the receiving of the work situation information, the detecting of the determination work condition, the recording of the change results in the internal data rule, and the displaying of the work support information until determining that the work is complete;

transmitting, to the artificial intelligence server, a work completion notification as well as the recorded change results of the internal data rule.

2. A non-transitory computer readable medium comprising instructions stored thereon, which when executed by a computer system perform steps of a method comprising:

extracting from a term table by execution of an artificial intelligence server, messages, images and figures of a procedures' manual;

generating, a rule by associating the messages, the images and the figures of the procedures' manual to describe a determination condition of a work situation based on the procedures' manual, wherein the work situation describes: equipment installation, a position of the equipment as an object, temperature surrounding the equipment, and a body temperature of a worker acting on the equipment;

receiving, from the artificial intelligence server, the rule describing the work situation according to the procedures' manual and according to a signal of the equipment object indicating an operation state of work on the equipment object;

converting said rule into an internal data rule based on a degree of constitution association and a degree of condition association, wherein the degree of the constitution association ranges from a random work order to a predetermined work order, and wherein the degree of the condition association ranges from an essential association among the work situation, the equipment object and the determination work condition described in the procedures' manual, to a no association among the work situation, the equipment object, and the determination work condition;

inputting temperature information from a bio-information sensor of a smart device worn by the worker;

identifying a worker based on the bio-information sensor;

determining, by a work situation apparatus distinct from the artificial intelligence server, the work situation corresponding to the equipment object, to reduce processing loads of the artificial intelligence server;

receiving, by the artificial intelligence server from the work situation apparatus, the work situation corresponding to the equipment object;

detecting that the determination work condition is satisfied;

recording change results in the internal data rule;

virtually reproducing, according to the internal data rule, the recorded change results of the equipment object and the work situation due to the worker acting on the equipment object;

displaying work support information, comprising the extracted messages, images and figures superimposed or overlaid within a visual field of the worker;

performing machine learning with input from multiple model cases based on the recorded change results;

optimizing, based on the recorded change results, the internal data rule by performing machine learning selection, among multiple learned model cases, of a model case that gained a highest evaluation among the recorded change results in the internal data rule;

presenting differences from the highest evaluation to respective points of the virtually reproduced change results;

inputting additional sensor information from the bio-information sensor comprising one or more of: pulse and blood pressure of the worker;

repeating the receiving of the work situation information, the detecting of the determination work condition, the recording of the change results in the internal data rule, and the displaying of the work support information until determining that the work is complete;

transmitting, to the artificial intelligence server, a work completion notification as well as the recorded change results of the internal data rule.

3. The computer implemented method of claim 1 further comprising:

storing the work situation in association with the signal of the equipment object;

determining the condition of the work situation by referring to the signal of the equipment object from the stored work situation.

4. The computer implemented method of claim 1 further comprising:

outputting the signal of the equipment object of a specification that is common among a plurality of pieces of the equipment object.

5. The computer implemented method of claim 1 further comprising:

branching the work situation according to a plurality of rules related to the branching;

storing setting information in which the work situation related to the branching is set; and revising the procedures' manual based on the internal data rule and the stored setting information.

6. The computer implemented method of claim 1 further comprising:

branching the work situation according to a plurality of rules related to the branching;

revising the procedures' manual based on the plurality of rules related to the branching.

7. The computer implemented method of claim 1 further comprising:

recording changes in the messages, the images and the figures of the procedures' manual, by using the model case.

8. The computer implemented method of claim 1 further comprising:

outputting the work completion notification when the work situation satisfies the determination work condition of the internal data rule;

generating evaluation information on a work result by comparing differences of the multiple learned models optimizing the internal data rule based on the recorded change results.

9. The computer implemented method of claim 1 further comprising:

virtually reproducing the equipment object and the work situation that have changed due to the worker acting on the equipment according to the internal data rule;

selecting for each of the respective points of the change results, an optimization object; and optimizing the internal data rule with the selected optimization object.

10. The computer implemented method of claim 1 further comprising:

classifying the worker into one of three levels: beginner, normal and expert.

11. The computer implemented method of claim 1, wherein the work situation apparatus is a Raspberry PI computer.

12. The computer implemented method of claim 1, wherein the smart device worn by the worker is connected to the work situation apparatus by wireless communication.

13. The computer implemented method of claim 1, wherein the equipment object is a lamp.

* * * * *